Feb. 28, 1967
J. W. VANNOY
3,306,280
BARBECUE GRILLS
Filed Sept. 27, 1965
2 Sheets-Sheet 1
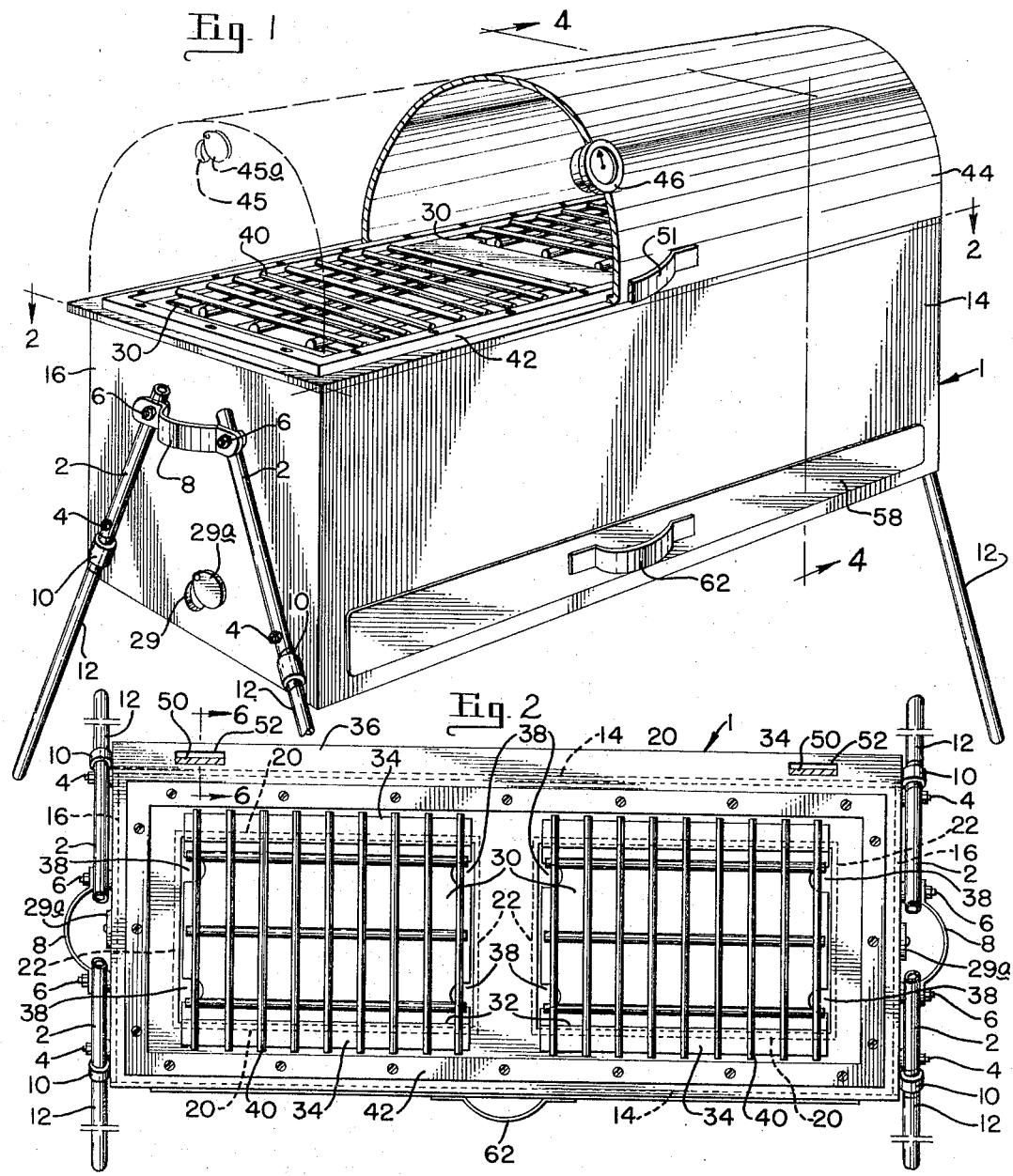
JAMES W. VANNOY
INVENTOR.
BY
Wayland D. Keith
HIS AGENT Feb. 28, 1967  J. W. VANNOY  3,306,280
BARBECUE GRILLS
Filed Sept. 27, 1965  2 Sheets-Sheet 2
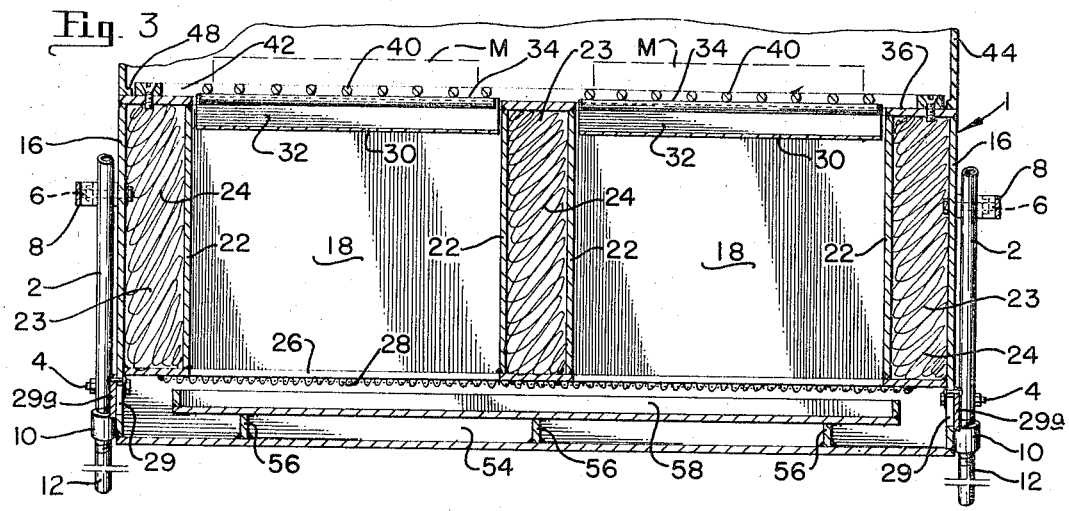
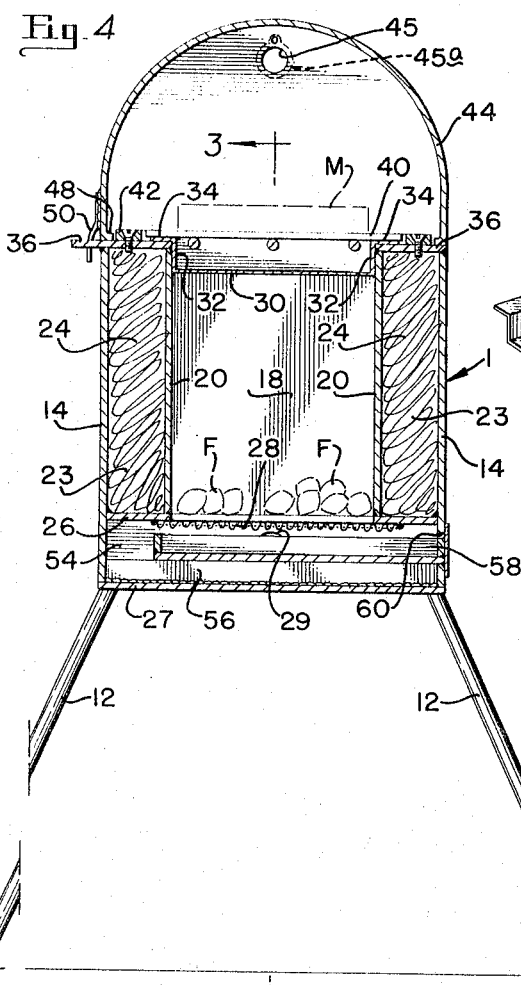
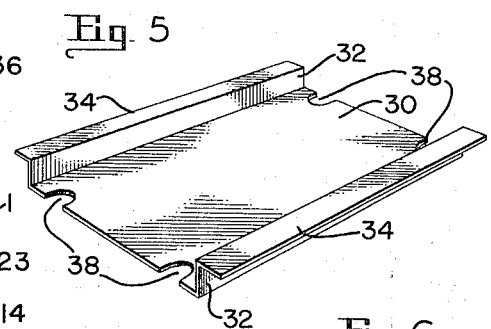
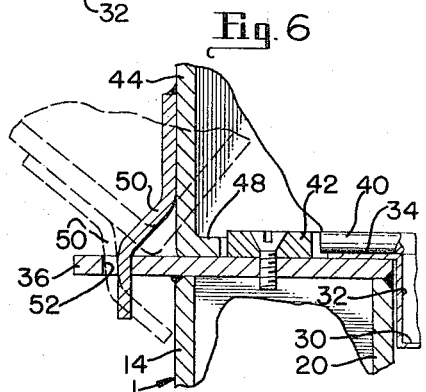
JAMES W. VANNOY
INVENTOR.
BY
Wayland D. Keith
HIS AGENT

United States Patent Office 3,306,280
Patented Feb. 28, 1967

3,306,280
BARBECUE GRILLS
James W. Vannoy, 441 W. Main St.,
Healdton, Okla. 73438
Filed Sept. 27, 1965, Ser. No. 490,221
5 Claims. (Cl. 126—25)

This invention relates to improvements in barbecue grills and more particular to barbecue grills which may be used indoors or out of doors, and the firing of which may be so regulated as to conserve fuel, and to hold heat over a long period of time.

Various barbecue grills or stoves have been proposed heretofore, but these, for the most part, were either to be used entirely indoors or out of doors, and were not readily convertible from one use to the other. The present barbecue grill is so constructed that a small amount of fuel, such as charcoal, may be fired within the fire box, and when the fuel has been burned, the heat in the barbecue grill will be maintained over a considerable period of time, both to complete the cooking of the food and to maintain the food hot until the time it is to be served.

The present barbecue grill is so constructed that it is light in weight, and may be easily handled to enable the moving thereof from place to place. The present unit may be made small and compact thereby to enable it to be readily transported in a car, even while the fire is maintained therein, thereby enabling food to be partially cooked, the grill placed in a car, with the food therein, and conveyed to the place where the food is to be served, so, upon arrival, the food will be fully cooked, hot and ready to serve.

An object of this invention is to provide a compact grill on which to broil or barbecue food with a minimum of fuel, which will retain heat over a consideratble period of time after the fuel is exhausted.

Another object of the invention is to provide a compact barbecue grill which is so insulated that it will maintain food therein hot, with only a minimum of heat being transmitted to the exterior, thereby obviating the possibility of accidental fire while the grill is being used indoors or while it is being carried in a car, with the fuel therein burning.

Still a further object of the invention is to provide a barbecue grill which may be closed so as to be substantially airtight to prevent the escape of odors and/or gases, when it is desired to do so.

Yet another object of the invention is to provide a barbecue grill whereby the heat thereof may be regulated in accordance with a heat indicator thereon.

Still another object of the invention is to provide a barbecue grill which has a grill rack to support the food being cooked a spaced distance above a drip pan, which drip pan is so positioned as to divert fatty drippings to an end of the respective fire boxes so as to minimize fire hazards.

Still a further object of the invention is to provide a barbecue grill which has a hingeable, removable hood or cover thereon which hood or cover will readily enclose the food being cooked, but which may be readily opened or removed.

A final object of the invention is to provide a portable barbecue grill having legs, which legs are readily demountable, in order that the grill may be set on a table or other plane surface, and which grill has handles to enable the grill to be readily moved from place to place.

With these objects in view and others which will be apparent as the description proceeds, reference is to be had to the accompanying drawings in which like reference characters designate like parts in the several views thereof, in which:

FIG. 1 is a perspective view of the barbecue grill, showing a portion of the hood as broken away and in section, a portion thereof being shown in dashed, phantom outline, to show the details of construction, one of the legs being broken away;

FIG. 2 is a sectional view taken on the line 2—2 of FIG. 1, looking in the direction indicated by the arrows, with parts broken away and shortened;

FIG. 3 is a sectional view taken on the line 3—3 of FIG. 4, but showing a portion of the hood thereon, and showing the legs as broken away and shortened;

FIG. 4 is a sectional view taken on the line 4—4 of FIG. 1, looking in the direction indicated by the arrows, with a portion of a leg being broken away and re-positioned;

FIG. 5 is a perspective view of the drip pan used at the top of each of the fire boxes in the barbecue grill; and FIG. 6 is an enlarged, fragmentary, sectional view taken on the line 6—6 of FIG. 2, looking in the direction indicated by the arrows;

With more detailed reference to the drawing, the numeral 1 designates generally the body of the barbecue grill, which is made with a substantially rectangular base. A pair of legs 2 is secured to each end of the body 1 by means of bolts 4 and 6. The legs of each pair of legs are comparatively close together at the upper ends thereof, and the same bolts which secure the legs to the body, near the upper ends thereof, also secure a carrying handle 8 in place at each end of the body 1. The legs diverge downwardly and outwardly toward the lower ends thereof, and each leg has a sleeve 10 thereon, into each of which sleeves 10 a leg extension is fitted. It is preferable to have the sleeves 10 and leg extensions 12 threaded for complementary engagement.

The body 1 has the outer shell portion thereof made of sheet metal plates, as indicated at 14 and 16, to form the respective sides and ends of the outer receptable of the body 1, as will best be seen in FIGS. 2 and 4. Inner receptacles 18 form fire boxes, which are spaced inwardly from the exterior walls 14 and 16, and the fire boxes 18 are spaced apart and have complementary side walls 20 and 22, which inner walls 20 and 22 are formed of sheet metal plates. A space is formed between the walls 20 and 22 and the outer walls 14 and 16, and between adjacent inner walls 22 and 22. A space or chamber 23 is formed between the inner and outer walls and between the adjacent walls 22—22, which is filled with an insulating media 24, such as asbestos wool, rock wool or the like.

The bottom of the chamber 23 formed between walls 16 and 22, 22—22 and 14–20 has a lower plate 26 secured thereto, as by welding, so the lower portions of the respective fire boxes 18 are closed by a perforate material 28, such as expanded metal, screening, spaced apart bars or the like.

The receptacles 18, which form the fire boxes, are adapted to receive fuel F therein, such as charcoal, chips, and the like, the combustion of which is aided by a vent hole 29 which is formed in each end plate 16 of the body 1. A damper 29a is pivotally mounted to each end plate 16, adjacent each vent hole 29, so the damper may be swung across the respective holes to regulate the amount of air admitted into the chamber 54 which is in communication with the fire boxes 18 through perforate members 28. The dampers 29a may be closed to prevent sparks or fire from passing out through holes 29 in end plates 16.

The upper ends of the receptacle which form the fire boxes 18 is open and is adapted to receive a drip plate or pan 30, which pan has the sides thereof up-turned, as indicated at 32, with out-turned flanges 34, which flanges 34 are adapted to rest on the upper face of an upper plate 36, which plate 36 closes the chambers 23 in which the insulation 24 is positioned. The upper plate 36 is preferably secured to metal plates 14, 16, walls 20 and 22 as by welding. The drip pan or plate 30 has notched openings formed in each end thereof to enable grease and drippings from the food being cooked to drip down into the fire box or boxes 18, but at the same time, permit smoke and heat from the fuel to pass upward therethrough. The notches are numbered 38.

A grill or rack member 40 is positioned over each fire box 18, which grills are supported on the flanges 34 of the drip pan or plate 30 above each of the fire boxes 18. A rectangular frame 42 surrounds the upper end of the fire boxes 18 to form a guide on the inner sides thereof for the grills or racks 40, and the outer side of the frame 42 forms a guide for the lower edge of the hood 44.

The hood 44 is preferably substantially semi-cylindrical in shape, with the ends thereof being closed. A heat indicator 46 is positioned in the front thereof. An opening 45 is formed in each end of hood 44 to vent the gases and vapors therefrom, the venting of which gases and vapors is regulated by the damper 45a which is pivotally mounted on each end of the hood in position to be moved over the respective openings 45, to any degree desired, or to be completely closed thereby. The closing of the dampers 29a and 45a will make the barbecue grill maintain the grill substantially free of draft, thereby enabling the food, such as meat M, in a heated condition, while the grill is being transported, or the closed vents will allow the heat to be held in the hood, to continue cooking the food, during transportation or until time of serving.

The lower edge of the hood 44 has an inturned rim 48, which inturned rim surrounds rectangular frame 42 so as to form a substantially weather tight seal between the hood and the receptacle which forms the grill. The hood 44 has a pair of pronglike hinge members 50 mounted thereon at spaced intervals along the rear side thereof and secured thereto, which pronglike hinges extend downward through the respective openings 52 in upper plate 36, as will best be seen in FIGS. 2, 4 and 6. The pronglike hinges 50 permit the hood 44 to be seated on the upper plate 36, as shown in FIG. 1, or the hood may be rocked about the hinges 50, from the position shown in full outline in FIG. 6 to the position shown in dashed outline therein, at which position the hood is supported at an angle. A handle 51 is secured to side of the hood 44 opposite the hinges, to enable the hood to be moved from the position, as shown in full outline in FIGS. 1 and 4, to the position as shown in dashed outline in FIG. 6.

The lower part of the body 1 has bottom plate 27 secured thereto, as by welding, to form a chamber 54, which chamber 54 has spaced apart, transverse bars 56 therein, which bars serve as a support for an ash tray 58, above the bottom plate 27. The ash tray 58 passes through opening 60 in a side 14 of the body 1. The ash tray 58 may have a handle 62 thereon to enable the removal of the ash tray for cleaning the barbecue grill.

Having thus clearly shown and described the invention, what is claimed as new and desired to be secured by Letters Patent is:

1. A grill for broiling food, which grill comprises:
   (a) a substantially rectangular body having outer walls and a bottom plate,
   (b) a plurality of receptables formed within said body and being spaced inward from said outer walls, and being spaced from each other and from said bottom plate,
   (c) an upper plate closing the space between said outer walls and said receptacles and between said receptacles,
      (1) said receptacles being normally open at the tops thereof,
   (d) a perforate plate extending transversely across the lower ends of said receptacles to form a bottom therefor,
   (e) a further plate closing the space between the lower ends of said receptacles and said outer walls and between the lower ends of said receptacles,
   (f) heat insulating material interposed between said outer walls and said receptacles and between the adjacent walls of said receptacles,
   (g) a grill extending across said open tops of said receptacles to normally support food thereon,
   (h) a hooded cover positioned over the top of said grill and encompassing the open tops of said receptacles,
   (i) a side of said rectangular body having an elongated opening formed therein, and
      (1) an ash receiving tray fitted within said elongated opening and extending beneath said receptacles.

2. A grill for broiling food, as defined in claim 1; wherein
   (a) a plurality of transverse bars extend across said body above the bottom plate and below the ash receiving tray to support said tray thereon.

3. A grill for broiling food, which grill comprises:
   (a) a substantially rectangular body having outer walls and a bottom plate,
   (b) a plurality of receptacles formed within said body and being spaced inward from said outer walls, and being spaced from each other and from said bottom plate,
   (c) an upper plate closing the space between said outer walls and said receptacles and between said receptacles,
      (1) said receptacles being normally open at the tops thereof,
   (d) a perforate plate extending transversely across the lower ends of said receptacles to form a bottom therefor,
   (e) a further plate closing the space between the lower ends of said receptacles and said outer walls and between the lower ends of said receptacles,
   (f) heat insulating material interposed between said outer walls and said receptacles and between the adjacent walls of said receptacles,
   (g) a grill extending across said open tops of said receptacles to normally support food thereon,
   (h) a hooded cover positioned over the top of said grill and encompassing the open tops of said receptacles,
   (i) a plurality of transverse bars extending across said body above the bottom plate and below the ash receiving tray to support said tray thereon.

4. A grill for broiling food, which grill comprises;
   (a) a substantially rectangular body having outer walls and a bottom plate,
   (b) a plurality of receptacles formed within said body and being spaced inward from said outer walls, and being spaced from each other and from said bottom plate,
   (c) an upper plate closing the space between said outer walls and said receptacles and between said receptacles,
      (1) said receptacles being normally open at the tops thereof,
   (d) a perforate plate extending transversely across the lower ends of said receptacles to form a bottom therefor,
   (e) a further plate closing the space between the lower ends of said receptacles and said outer walls and between the lower ends of said receptacles,
   (f) heat insulating material interposed between said outer walls and said receptacles and between adjacent walls of said receptacles,
   (g) a grill extending across said open tops of said receptacles to normally support food thereon,
   (h) a hooded cover positioned over the top of said grill and encompassing the open tops of said receptacles,
   (i) said rectangular body having legs mounted thereon and extending downward therefrom, (1) each said leg having a sleeve thereon above said bottom plate,
(2) a leg extension adapted to fit within each said sleeve to support said grill a spaced distance above a surface.

5. A grill for broiling food, which grill comprises;
(a) a substantially rectangular body having outer walls and a bottom plate,
(b) a plurality of receptacles formed within said body and being spaced inward from said outer walls, and being spaced from each other and from said bottom plate,
(c) an upper plate closing the space between said outer walls and said receptacles and between said receptacles,
 (1) said receptacles being normally open at the tops thereof,
(d) a perforate plate extending transversely across the lower ends of said receptacles to form a bottom therefor,
(e) a further plate closing the space between the lower ends of said receptacles and said outer walls and between the lower ends of said receptacles,
(f) heat insulating material interposed between said outer walls and said receptacles and between the adjacent walls of said receptacles,
(g) a grill extending across said open tops of said receptacles to normally support food thereon,
(h) a hooded cover positioned over the top of said grill and encompassing the open tops of said receptacles,
(i) each end of said rectangular body having a vent formed therein,
 (1) movable closure means pivotally secured to each end of said body in position to cover said respective vents to any desired degree.

References Cited by the Examiner

UNITED STATES PATENTS

| | | | |
|---|---|---|---|
| 1,524,961 | 2/1925 | Asche | 126—9 |
| 3,085,562 | 4/1963 | Persinger et al. | 126—25 |
| 3,191,592 | 6/1965 | Lorbacher | 126—25 |

FOREIGN PATENTS 623,801   3/1927   France.

FREDERICK L. MATTESON, JR., *Primary Examiner.*

E. G. FAVORS, *Assistant Examiner.*